(12) United States Patent
Potts

(10) Patent No.: US 6,209,902 B1
(45) Date of Patent: Apr. 3, 2001

(54) VEHICLE HITCH AND TRAILER TONGUE ALIGNMENT SYSTEM

(76) Inventor: Charles K. Potts, 15227 Clearspring Rd., Williamsport, MD (US) 21795

( * ) Notice: Subject to any disclaimer, the term of this patent is extended or adjusted under 35 U.S.C. 154(b) by 0 days.

(21) Appl. No.: 09/540,505

(22) Filed: Mar. 31, 2000

(51) Int. Cl.[7] ...................................................... B60D 1/36
(52) U.S. Cl. ........................... 280/477; 33/264; 116/28 R
(58) Field of Search ............................. 280/477; 33/264, 33/386; 116/28 R

(56) References Cited

U.S. PATENT DOCUMENTS

| D. 270,906 | 10/1983 | Orr . | |
|---|---|---|---|
| 2,815,732 | 12/1957 | Majors . | |
| 3,720,000 | * 3/1973 | Schlegel | 33/264 |
| 3,774,149 | * 11/1973 | Bennett | 340/431 |
| 3,889,384 | 6/1975 | White . | |
| 3,901,536 | * 8/1975 | Black | 280/477 |
| 3,966,231 | 6/1976 | Metzler . | |
| 4,012,056 | 3/1977 | Christensen . | |
| 4,169,610 | 10/1979 | Paufler . | |
| 4,313,264 | * 2/1982 | Miller, Sr. . | |
| 4,852,901 | * 8/1989 | Beasley et al. | 280/477 |
| 5,191,328 | * 3/1993 | Nelson . | |
| 5,927,229 | * 7/1999 | Karr, Jr. . | |

* cited by examiner

*Primary Examiner*—Kevin Hurley

(57) ABSTRACT

A trailer hitch and tongue alignment system for the purpose of helping a user line up the hitch ball of a vehicle to a hitch ball receiver of a trailer. The trailer hitch and tongue alignment system includes a trailer hitch and tongue alignment system for mounting on a vehicle and a trailer to be hitched to the vehicle. The system comprises a projecting apparatus for mounting on the hitch ball support of the vehicle, and a target apparatus. The projecting apparatus includes a first support mount, and support post mounted to the support mount for extending in a substantially vertical orientation when the support mount is mounted on a hitch ball support. A connector is mounted on the support post. A top member is mounted to the connector with a light source mounted on the top member for projecting a focused beam of light. The target apparatus is adapted for mounting on the tongue of the trailer. The target apparatus includes a second support mount for mounting to the tongue of the trailer. A pole is mounted to the second support mount. A target is provided for being illuminated by light from the projecting apparatus. The target is slidably moveable along the length of the pole. The connector may be pivoted on the support post to align the tubular member with a longitudinal axis of the hitch ball support for projecting light rearwardly from the vehicle toward the targeting apparatus on the trailer.

20 Claims, 3 Drawing Sheets

VEHICLE HITCH AND TRAILER TONGUE ALIGNMENT SYSTEM

BACKGROUND OF THE INVENTION

1. Field of the Invention

The present invention relates to vehicle hitch and trailer tongue alignment systems for mounting on a vehicle and a trailer to be hitched to the vehicle; and more particularly pertains to a new system for helping a user line up the hitch ball of a vehicle to a hitch ball receiver of a trailer.

2. Description of the Prior Art

The use of vehicle hitch and trailer tongue alignment systems is known in the prior art. More specifically, vehicle hitch and tongue trailer alignment systems heretofore devised and utilized are known to consist basically of familiar, expected and obvious structural configurations, notwithstanding the myriad of designs encompassed by the crowded prior art which have been developed for the fulfillment of countless objectives and requirements.

Known prior art includes U.S. Pat. No. 3,889,384; U.S. Pat. No. 4,169,610; U.S. Pat. No. 4,012,056; U.S. Pat. No. 3,966,231; U.S. Pat. No. 2,815,732; and U.S. Pat. No. Des. 270,906.

While these devices fulfill their respective, particular objectives and requirements, the aforementioned patents do not disclose a new trailer hitch and tongue alignment system for mounting on a vehicle and a trailer to be hitched to the vehicle.

The hitch mate according to the present invention substantially departs from the conventional concepts and designs of the prior art, and in so doing provides an apparatus primarily developed for the purpose of for helping a user line up the vehicles hitch ball to a trailers hitch ball receiver.

SUMMARY OF THE INVENTION

In view of the foregoing disadvantages inherent in the known types of trailer hitch and tongue alignment system now present in the prior art, the present invention provides a new hitch mate construction wherein the same can be utilized for the purpose of helping a user line up the hitch ball of a vehicle to a hitch ball receiver of a vehicle.

The general purpose of the present invention, which will be described subsequently in greater detail, is to provide a new vehicle hitch and trailer tongue alignment system apparatus and method which has many of the advantages of the vehicle hitch and trailer tongue alignment system mentioned heretofore and many novel features that result in a new hitch mate which is not anticipated, rendered obvious, suggested, or even implied by any of the prior art trailer hitch and tongue alignment system, either alone or in any combination thereof.

To attain this, the present invention generally comprises a vehicle hitch and trailer tongue alignment system for mounting on a vehicle and a trailer to be hitched to the vehicle. The system comprises a projecting apparatus for mounting on the hitch ball support of the vehicle and a target apparatus. The projecting apparatus includes a first support mount for mounting to the hitch ball support. A support post is mounted to the support mount for extending in a substantially vertical orientation when the support mount is mounted on a hitch ball support. A connector member is mounted on the support post, and a top member is mounted to the connector member in a manner such that a recess of the op member receives a light source for projecting a focused light beam.

The target apparatus is for mounting on the tongue of the trailer adjacent to the hitch ball receiver of the tongue. The target apparatus includes a second support mount for mounting to the tongue of the trailer. A pole is mounted to the second support mount. A target is provided for being illuminated by light from the projecting apparatus. The target is adapted for mounting on the pole. The target is slidably moveable along the length of the pole. The connector member may be pivoted on the support post to align the light beam from the light source with a longitudinal axis of the hitch ball support for projecting light rearwardly from the vehicle toward the targeting apparatus on the trailer.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new vehicle hitch and trailer tongue alignment system apparatus and method which has many of the advantages of the vehicle hitch and trailer tongue alignment system mentioned heretofore and many novel features that result in a new vehicle hitch and trailer tongue alignment system which is not anticipated, rendered obvious, suggested, or even implied by any of the prior art hitch and tongue alignment system, either alone or in any combination thereof.

It is another object of the present invention to provide a new vehicle hitch and trailer tongue alignment system, which may be easily and efficiently manufactured and marketed.

It is a further object of the present invention to provide a new vehicle hitch and trailer tongue alignment system, which is of a durable and reliable construction.

An even further object of the present invention is to provide a new vehicle hitch and trailer tongue alignment system which is susceptible of a low cost of manufacture with regard to both materials and labor, and which accordingly is then susceptible of low prices of sale to the consuming public, thereby making such vehicle hitch and trailer tongue alignment system economically available to the buying public.

Still yet another object of the present invention is to provide a new vehicle hitch and trailer tongue alignment system which provides in the apparatuses and methods of the prior art some of the advantages thereof, while simultaneously overcoming some of the disadvantages normally associated therewith.

Still another object of the present invention is to provide a new vehicle hitch and trailer tongue alignment system for the purpose of helping a user line up the hitch ball of a vehicle to a hitch ball receiver of a trailer.

Still yet another object of the present invention is to provide a new vehicle hitch and trailer tongue alignment system that for the purpose of helping a user line up the vehicles hitch ball to a trailer's hitch ball receiver. The retractable rod allows a user to easily line up the trailer and the hitch during the daytime without the need for a person at the back of the vehicle to guide the driver.

Even still another object of the present invention is to provide a new vehicle hitch and trailer tongue alignment system which includes a rod with a light source to allow a user to easily line up the trailer and hitch at night or in low light conditions.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be made to the accompanying drawings and descriptive matter in which there are illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

DESCRIPTION OF THE PREFERRED EMBODIMENT

Figures 1, 2:
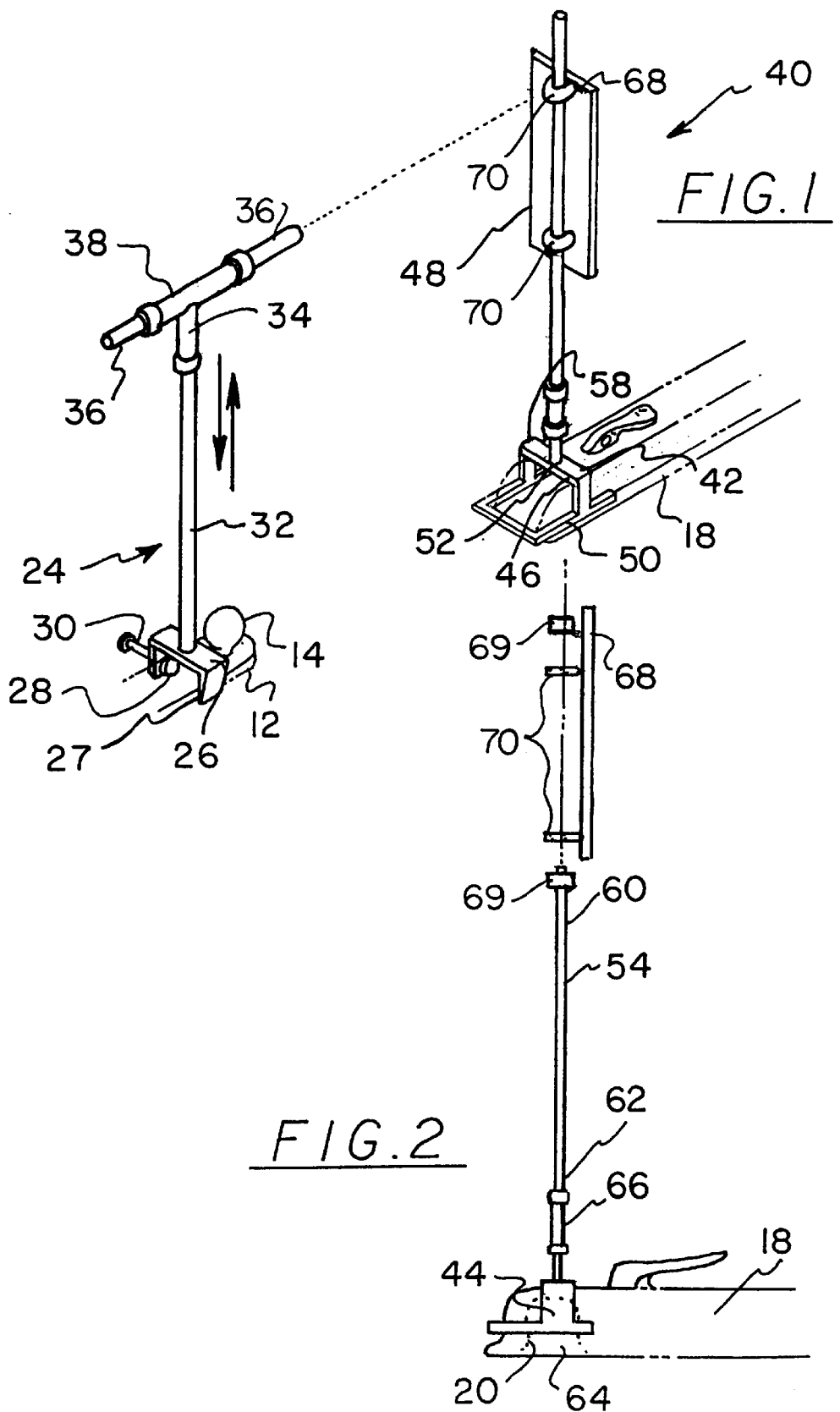
FIG. 1 is a partial perspective view of a new vehicle hitch and trailer tongue alignment system according to the present invention.
FIG. 2 is a side view of the present invention.
Figure 3:
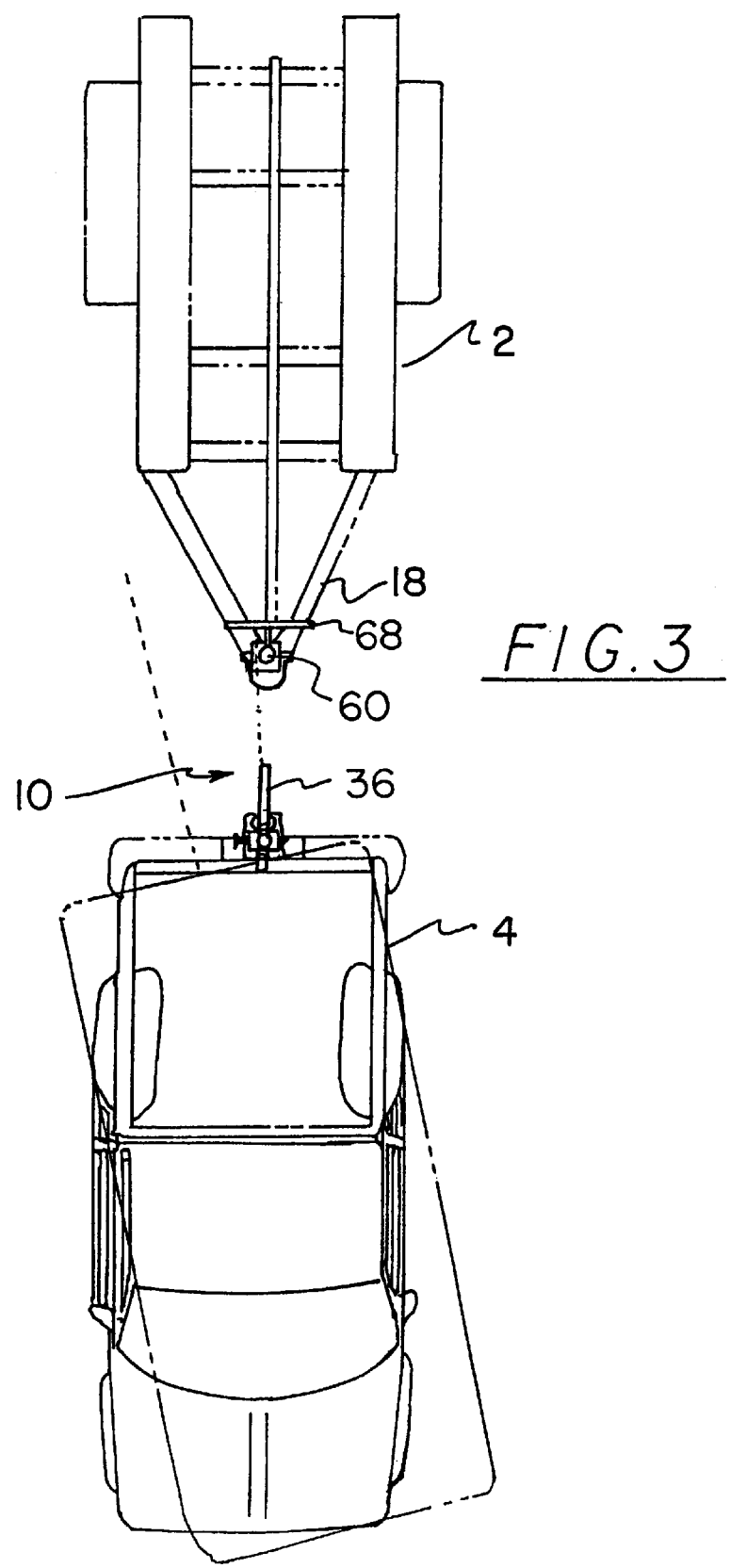
FIG. 3 is a schematic top plan view of the present invention.
Figure 4:
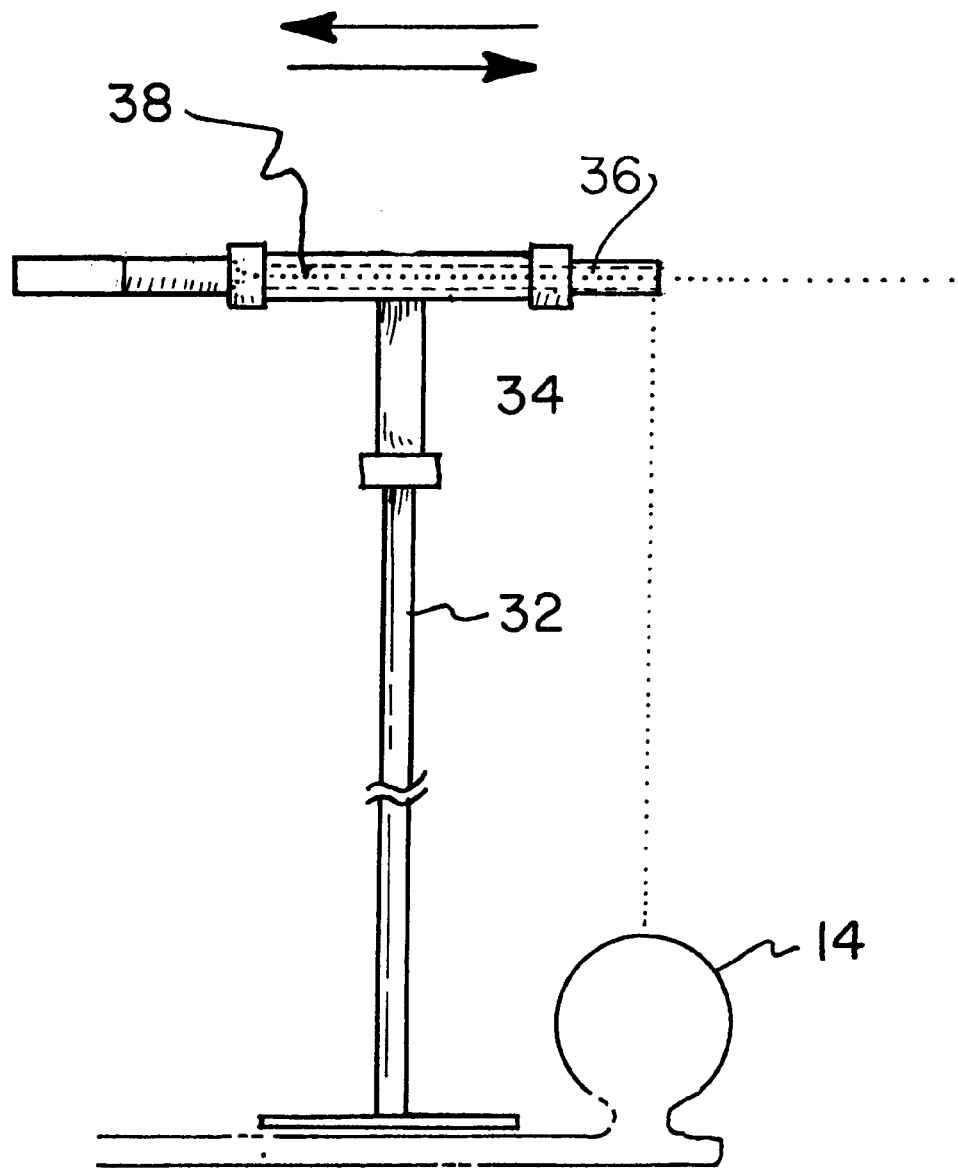
FIG. 4 is a partial side view of the present invention.

With reference now to the drawings, and in particular to FIGS. 1 through 4 thereof, a new vehicle hitch and trailer tongue alignment system embodying the principles and concepts of the present invention and generally designated by the reference numeral 10 will be described.

As best illustrated in FIGS. 1 through 4, the invention includes a vehicle hitch and trailer tongue alignment system 10 for mounting on a vehicle 4 and a trailer 2 to be hitched to the vehicle 4. The vehicle 4 suitably includes a hitch ball support 12 extending rearwardly from the vehicle 4 and a hitch ball 14 mounted on an upper surface of the hitch ball support 12. The trailer 2 suitably includes a tongue 18 with hitch ball receiver 20 mounted at a forward end of the tongue 18. The hitch ball receiver 20 includes a hitch ball cavity 64 for receiving the hitch ball 14.

The system of the invention includes a projecting apparatus 24 for mounting on the hitch ball support 12 of the vehicle 4. The projecting apparatus 24 includes a first support mount 26 for mounting to the hitch ball support 12. The first support mount 26 comprises a clamp 28 for clamping on the hitch ball support 12 at a location adjacent to and forward of the hitch ball 14. The clamp 28 includes a base 25 and a pair of depending arms 27 mounted to the base 25. The depending arms 27 are substantially parallel. A space formed between the depending arms for receiving a portion of the support 12. One of the depending arms 27 includes a threaded rod 30 passing through a threaded hole 31 in the arm 27. The threaded rod 30 includes an end which is advanceable into the space between the arms 27 for pressing against a hitch ball support 12 received between the arms 27 and forcing the support against the other of the arms 27. A support post 32 is mounted to the support mount 26 for extending in a substantially vertical orientation when the support mount 26 is mounted on a hitch ball support 12.

A connector member 34 is mounted on the support post 32, and may have a degree of slidability on the post 32 for permitting vertical adjustment of the distance between the connector member 34 and the hitch ball 14. The connector member 34 includes a first recess for receiving the support post 32, and preferably the connector member 34 is pivotable on the support post for permitting directional adjustment. A top member 38 is fixedly mounted to the connector member 34, and has second recess for receiving and mounting a light source 36 for shining a relatively focused linear beam of light. A lumen in communication with the second recess may extend through the top member 38 for permitting the light source 36 to be shifted in the lumen to vertically align an end of the light source with the hitch ball (see FIG. 4). The top member 38 (and the light source mounted thereon) extends substantially perpendicular to the support post 32 for projecting a light beam that is substantially horizontal when the support post is mounted on a hitch ball support.

A target apparatus 40 is provided for mounting on the tongue 18 of the trailer 2 adjacent to the hitch ball receiver 20 of the tongue. The target apparatus 40 includes a second support mount 42 for mounting to the tongue 18 of the trailer 4. The second support mount 42 comprises a saddle 44 for embracing on the hitch ball receiver 20. The saddle 44 comprises a bridge portion 46 and a locating portion 48. The bridge portion 46 includes a lateral segment 58 for resting on a top surface of the hitch ball receiver 20 in an orientation transverse to the longitudinal axis of the tongue 18, and a pair of depending segments depending from the lateral segment. The locating portion 48 includes a front segment 52 and a pair of side segments 50 extending in a spaced parallel relationship from the front segment 52.

A pole 54 is mounted to the second support mount 42, and is also mounted to the bridge portion 46 of the saddle 44 of the second support mount 42. The pole 54 extends in a substantially vertical orientation when the second support mount 42 is mounted on a hitch ball receiver 20. The pole 54 includes an upper end and a lower end, with the lower end being mounted to a central location on the lateral segment 58 of the bridge portion 46. The pole 54 includes an upper portion 60 and a lower portion 62, and the upper portion 60 is removably couplable to the lower portion 62 of the pole. The depending segments 50 of the bridge portion 46 are connected to the side segments 50 of the locating portion 48 in a manner positioning the lower end 62 of the pole 54 above the hitch ball cavity 64 of the hitch ball receiver 20. A pole coupler 66 is provided for removable coupling the upper portion 60 of the pole 54 to the lower portion 62 of the pole 54.

A target 68 is provided for being illuminated by light from the light source of the projecting apparatus 24. The target 68 is designed for mounting on the pole 54. The target 68 may be slidably moveable along the length of the pole 54. The target 68 is elongate and includes a longitudinal axis that is oriented parallel to the longitudinal axis of the pole 54. The target 68 comprises a plate and includes a pair of spaced mounts 70 for receiving portions of the pole. The mounts 68 may be mounted on a front face of the plate of the target 68, such that the pole is located in front of the target toward the projecting apparatus. The spaced mounts 70 may provide sufficient frictional mounting with the post, or may have other suitable means for resisting unintentional slippage of the target along the pole. In one preferred embodiment, separate frictionally slidable members 69 (such as, for example, formed out of an elastomeric material) that may be forcibly slid along the pole (See FIG. 2). One of these members 69 may be positioned on either side of the spaced mounts, for selectively trapping the mounts therebetween.

Significantly, the target may be of a relatively darker color, and the pole of a lighter color, such that the pole represents the axis of the hitch ball cavity and signifies proper alignment when the light beam from the projecting apparatus shines on the pole. The darker target surface allows the user to see the projection of the light beam when it is just off of the axis of the pole, for assisting in finer adjustments of the vehicle to put the hitch ball on target with the hitch ball cavity. Also, the location of the spaced mounts may permit the user to determine whether the height of the tongue of the trailer is raised sufficiently high off of the ground to accept the hitch ball. For example, the spaced mounts may be positioned at opposite ends of the preferred range of vertical tongue heights (relative to the distance the light beam is separated from the hitch ball) for indicating not only the lateral alignment of the hitch ball with the tongue, but also the acceptable vertical alignment of the hitch ball with the hitch ball cavity.

In use, the vehicle hitch and trailer tongue alignment system assists a driver in properly aligning a hitch to a trailer without the need for another person to guide the driver. The connector member 34 may be pivoted on the support post 32 to align the top member 38 with a longitudinal axis of the hitch ball support 12 for projecting light rearwardly from the vehicle 4 toward the targeting apparatus 40 on the trailer 2. The vertical position of the may also be adjusted.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A trailer hitch and tongue alignment system for mounting on a vehicle and a trailer to be hitched to the vehicle, the vehicle having a hitch ball support extending rearwardly from the vehicle and a hitch ball mounted on an upper surface of the hitch ball support bar, the trailer having a tongue with hitch ball receiver mounted at a forward end of the tongue, the hitch ball receiver having a hitch ball cavity for receiving the hitch ball, the system comprising:

a projecting apparatus for mounting on the hitch ball support of the vehicle, the projecting apparatus including:

a first support mount for mounting to the hitch ball support;

a support post mounted to the support mount for extending in a substantially vertical orientation when the support mount is mounted on a hitch ball support;

a connector member mounted on the support post;

a top member mounted to the connector member; and a light source mounted on the top member for projecting a focused beam of light;

a target apparatus for mounting on the tongue of the trailer adjacent to the hitch ball receiver of the tongue, the target apparatus including:

a second support mount for mounting to the tongue of the trailer;

a pole mounted to the second support mount;

a target for being illuminated by light from the projecting apparatus, the target being adapted for mounting on the pole, the target being slidably moveable along the length of the pole;

wherein the connector member is pivotable on the support post for aligning the beam of light from the light source on the top member with a longitudinal axis of the hitch ball support for projecting light rearwardly from the vehicle toward the targeting apparatus on the trailer.

2. The trailer hitch and tongue alignment system of claim 1, wherein the first support mount comprises a clamp for clamping on the hitch ball support at a location adjacent and forward of the hitch ball.

3. The trailer hitch and tongue alignment system of claim 2, wherein the clamp includes a base and a pair of depending arms mounted to the base, the depending arms being parallel and having a space formed therebetween for receiving a portion of the support.

4. The trailer hitch and tongue alignment system of claim 3, wherein one of the depending arms has a threaded rod passing through a threaded hole in the arm, the threaded rod having an end which is advanceable into the space between the arms for pressing against a hitch ball support received between the arms and forcing the support against the other of the arms.

5. The trailer hitch and tongue alignment system of claim 1, wherein the connector member is slidably mounted on the support post for permitting vertical adjustment of the distance between the connector member and the hitch ball when the projecting apparatus is mounted on a hitch support.

6. The trailer hitch and tongue alignment system of claim 1, wherein the connector member has a first recess for receiving the support post, the connector member being pivotably mounted on the support post.

7. The trailer hitch and tongue alignment system of claim 1, wherein the top member has a second recess for receiving the light source.

8. The trailer hitch and tongue alignment system of claim 1, wherein the top member is elongate and extends substantially perpendicular to the support post.

9. The trailer hitch and tongue alignment system of claim 1 wherein a length of the support post is greater than a length of the top member.

10. The trailer hitch and tongue alignment system of claim 1, wherein the second support mount comprises a saddle for embracing on the hitch ball receiver, the saddle comprising a bridge portion and a locating portion.

11. The trailer hitch and tongue alignment system of claim 10, wherein the bridge portion has a lateral segment for resting on a top surface of the hitch ball receiver in an orientation transverse to the longitudinal axis of the tongue and a pair of depending segments depending from the lateral segment.

12. The trailer hitch and tongue alignment system of claim 11, wherein the locating portion has a front segment and a pair of side segments extending in a spaced parallel relationship from the front segment.

13. The trailer hitch and tongue alignment system of claim 11, wherein the pole is mounted to the bridge portion of the saddle of the second support mount.

14. The trailer hitch and tongue alignment system of claim 1, wherein the pole is adapted to extend in a substantially vertical orientation when the second support mount is mounted on a hitch ball receiver.

15. The trailer hitch and tongue alignment system of claim 1, wherein the pole has an upper end and a lower end, the lower end being mounted to a central location on the lateral segment of the bridge portion.

16. The trailer hitch and tongue alignment system of claim 1, wherein the pole has an upper portion and a lower portion, the upper portion being removably coupled to the lower portion of the pole.

17. The trailer hitch and tongue alignment system of claim 16, further comprising a pole coupler for removable coupling the upper portion of the pole to the lower portion of the pole.

18. The trailer hitch and tongue alignment system of claim 1 wherein the depending segments of the bridge portion are connected to the side segments of the locating portion in a manner positioning the lower end of the pole above the hitch ball cavity of the hitch ball receiver.

19. The trailer hitch and tongue alignment system of claim 1, wherein the target is adapted for mounting on the pole, the target being slidably moveable along the length of the pole.

20. The trailer hitch and tongue alignment system of claim 1, wherein the target is elongate and has a longitudinal axis that is oriented parallel to the longitudinal axis of the pole, the target comprising a plate having a pair of spaced mounts for receiving portions of the pole, the mounts being mounted on a back face of the plate of the target.

* * * * *